(12) United States Patent
Gattrell et al.

(10) Patent No.: US 6,634,484 B2
(45) Date of Patent: Oct. 21, 2003

(54) TRANSFER AND TILT APPARATUS

(75) Inventors: Tom Gattrell, Anniston, AL (US); Steven Eric Taylor, Midhurst (CA)

(73) Assignee: Honda of Canada Mfg., a division of Honda Canada Inc. (CA)

( * ) Notice: Subject to any disclaimer, the term of this patent is extended or adjusted under 35 U.S.C. 154(b) by 0 days.

(21) Appl. No.: 09/894,855

(22) Filed: Jun. 28, 2001

(65) Prior Publication Data

US 2002/0157920 A1 Oct. 31, 2002

Related U.S. Application Data

(60) Provisional application No. 60/290,947, filed on May 14, 2001, and provisional application No. 60/286,815, filed on Apr. 26, 2001.

(51) Int. Cl.$^7$ ............................................. B65G 47/24
(52) U.S. Cl. ................. 198/375; 198/409; 198/468.6; 198/750.14; 414/779; 414/782
(58) Field of Search .................. 198/375, 409, 198/468.6, 750.14; 414/779, 782, 648, 728

(56) References Cited

U.S. PATENT DOCUMENTS

| 1,276,898 | A |   | 8/1918  | Gallup et al.      |
|-----------|---|---|---------|--------------------|
| 3,149,712 | A |   | 9/1964  | Soman ............... 198/19 |
| 4,859,137 | A |   | 8/1989  | Bonora et al. ............ 414/648 |
| 4,874,078 | A |   | 10/1989 | Meyer ................ 198/409 |
| 5,220,990 | A |   | 6/1993  | Young-Cheol .......... 198/375 |
| 5,395,205 | A |   | 3/1995  | Dugas et al. ............ 414/728 |
| 5,924,545 | A | * | 7/1999  | Crorey ............... 198/375 |
| 5,947,677 | A | * | 9/1999  | Matsushima et al. ...... 414/609 |
| 6,050,771 | A | * | 4/2000  | Dykstra ............ 414/795.8 |
| 6,082,523 | A | * | 7/2000  | Weeks ................ 198/375 |
| 6,138,818 | A | * | 10/2000 | Green ................ 198/373 |
| 6,152,680 | A | * | 11/2000 | Howells et al. ......... 414/782 |
| 6,170,640 | B1 | * | 1/2001  | Takayama ............ 198/468.2 |
| 6,253,907 | B1 | * | 7/2001  | Lachmann et al. .... 198/750.14 |
| 6,264,418 | B1 | * | 7/2001  | Michael et al. .......... 414/733 |
| 6,378,690 | B1 | * | 4/2002  | Pessina et al. ......... 198/414 |

FOREIGN PATENT DOCUMENTS

| GB | 2080717 A | 2/1982 | ........... B22C/19/00 |
|----|-----------|--------|-----------------------|
| GB | 2321447   | 7/1998 | ........... B23D/47/04 |

\* cited by examiner

*Primary Examiner*—Christopher P. Ellis
*Assistant Examiner*—Rashmi Sharma
(74) *Attorney, Agent, or Firm*—Schwegman, Lundberg, Woessner & Kluth, P.A.

(57) ABSTRACT

A transfer device has an undercarriage with two or more carriage portions which are movable along a travel path between a first location and a second location. The carriage portions carrying at least one work piece support. A linkage extending between the carriage portions, where the linkage is operable to change the position of the work piece support when one carriage portion moves relative to another along the travel path.

74 Claims, 6 Drawing Sheets

TRANSFER AND TILT APPARATUS

This Appln claims benefit of Prov. No. 60/290,947 filed May 14, 2001 and claims benefit of Prov. No. 60/286,815 filed Apr. 26, 2001.

BACKGROUND OF THE INVENTION

1. Field of the Invention

The present invention relates to systems for transferring a work piece from a loading location to a processing location. More particularly, but not necessarily exclusively, the present invention relates to welding systems in automobile assembly lines. For example, the invention may be applied to a parts loading jig which is transferred between a welding station and a loading station.

2. Description of the Related Art

The auto industry has, in recent years, seen significant improvements in work place efficiencies. Robots are able to perform certain repetitive tasks with improved repeatability and accuracy.

It is common, for example, to have robots weld the vehicle sub-assembly components on a jig which holds the component parts of the sub-assembly in position at a welding station. Conventionally, the jig is transferred to a loading station which is a safe distance from the welding station to prevent injury. The jig is then 'tilted' to an angle making it more readily accessible to the assembly associate to load the jig.

Two drive units are normally used to perform these functions; one to transfer the jig between the welding and loading stations, and the other to 'tilt' the jig once it arrives at the loading station. The two drive units are independent, which means they have to be programmed and maintained separately, adding expense to the assembly process.

It is therefore an object of the present invention to provide a more efficient and cost effective transfer system.

It is another object of one embodiment of the present invention, to provide a transfer system for use in a welding installation wherein the transfer and tilt functions can are carried out by a single drive unit.

SUMMARY OF THE INVENTION

In one of its aspects, the present invention provides an apparatus for transferring and tilting a work piece, said apparatus comprising:

a transport carriage assembly for motion along a guide track having a limit position; the transport carriage assembly further comprising:
  a first carriage member, said first carriage member being pivotally connected to a first linkage arm at a first pivot point, and
  a second carriage member pivotally connected to a second linkage arm at a second pivot point, said first and second linkage arms being pivotally connected to one another at a third pivot point; and,
  a work piece support coupled with the second carriage member wherein, under a drive force, the transport carriage assembly travels along the guide track, until the second carriage member reaches the limit position, whereupon the first carriage member continues to move, decreasing its relative distance from the second carriage member and simultaneously causing the first linkage arm and the second linkage arm to pivot about the third pivot point, thereby causing the work piece support to tilt.

In one embodiment, the apparatus has a drive unit for driving the carriage assembly along the guide track. The drive unit has a drive motor and a transmission portion arranged to displace the first carriage member, and consequently the second carriage member, relative to the guide track. Desirably, the drive motor is a servo motor.

In another aspect of the present invention, there is provided a transfer device comprising an undercarriage with two or more carriage portions which are movable along a travel path between a first location and a second location, the carriage portions carrying at least one work piece support, a linkage extending between the carriage portions and which is operable to change the position of the work piece support when one carriage portion moves relative to another along the travel path. In one embodiment, the carriage portions are confined to a linear travel path and one of them is stationary during the period of relative moment between the carriage portions. The work piece support is movable between a work piece transfer position and a work piece loading position. The linkage has two pairs of arms which are pivoted together at a common pivot location and to a corresponding carriage portion at each end. The work piece support, which is fixedly attached to one of the pairs of arms near said common pivot location, is in a generally horizontal orientation at one of said locations and is inclined at the other of said locations.

Preferably, a limit station is provided on the travel path to limit movement of one of said carriage portions along the travel path. A releasable anchor portion is also provided for removably anchoring one of said carriage portions as the other carriage portion travels along the travel path.

In still another of its aspects, the present invention provides a transfer device for transferring a work piece from a loading station to a welding station, comprising an undercarriage with at least two carriage portions, which are movable along a travel path between the loading station and the welding station, the pair of carriage portions carrying at least one work piece support, a drive unit for driving the carriage portions along the travel path and a linkage joining the carriage portions. The linkage is operable to change the orientation of the work piece when one carriage portion moves relative to the other carriage portion along the travel path.

In yet another of its aspects, the present invention provides a welding installation comprising a welding station, a loading station and a transfer device for transferring a work piece between the stations. The transfer device has a work piece support and an undercarriage with two or more carriage portions. The carriage portions are movable by a drive unit along a travel path between the loading station and the welding station. The carriage portions are interconnected by a linkage which is operable to change the orientation of the work piece support when the position of one carriage portion changes relative to the other along the travel path.

In yet another aspect of the present invention, there is provided a method of transferring work pieces between a loading station and a welding station, comprising:

a. providing a work piece support;
b. supporting the work piece support on a carriage; equipping the carriage with a pair of carriage portions which are movable along a travel path; and
c. providing a linkage between the work piece support and the carriage portions which is capable of changing the orientation of the work piece support when one carriage portion travels relative to the other carriage portion along the travel path.

In still another aspect of the present invention, there is provided a transfer device for transferring a work piece between a loading station and a welding station, comprising:

a. undercarriage means with at least two of carriage means, the carriage means movable independently of one another along a travel path between the loading station and the welding station;

b. work piece support means supported by the undercarriage means;

c. drive means to transfer said carriage means between the loading and welding stations; and d. linkage means joining the carriage means for orienting the work piece support means between a transfer portion and a loading position; wherein the linkage is actuated when one carriage means moves relative to the other carriage means along the travel path.

In still another of its aspects, there is provided a method of transferring work pieces between a loading station and a work piece processing station, comprising:

a. a step for providing a work piece support;

b. a step for supporting the work piece support on a carriage;

c. a step for equipping the carriage with two or more carriage portions which are movable along a travel path; and d. a step for providing a linkage between the work piece support and the carriage portions which is capable of changing the orientation of the work piece support when one carriage portion travels relative to the other carriage portion along the travel path.

BRIEF DESCRIPTION OF THE DRAWINGS

Several preferred embodiments of the present invention will be provided, by way of example only, with reference to the appended drawings, wherein.

DESCRIPTION OF THE PREFERRED EMBODIMENTS

Figure 1:
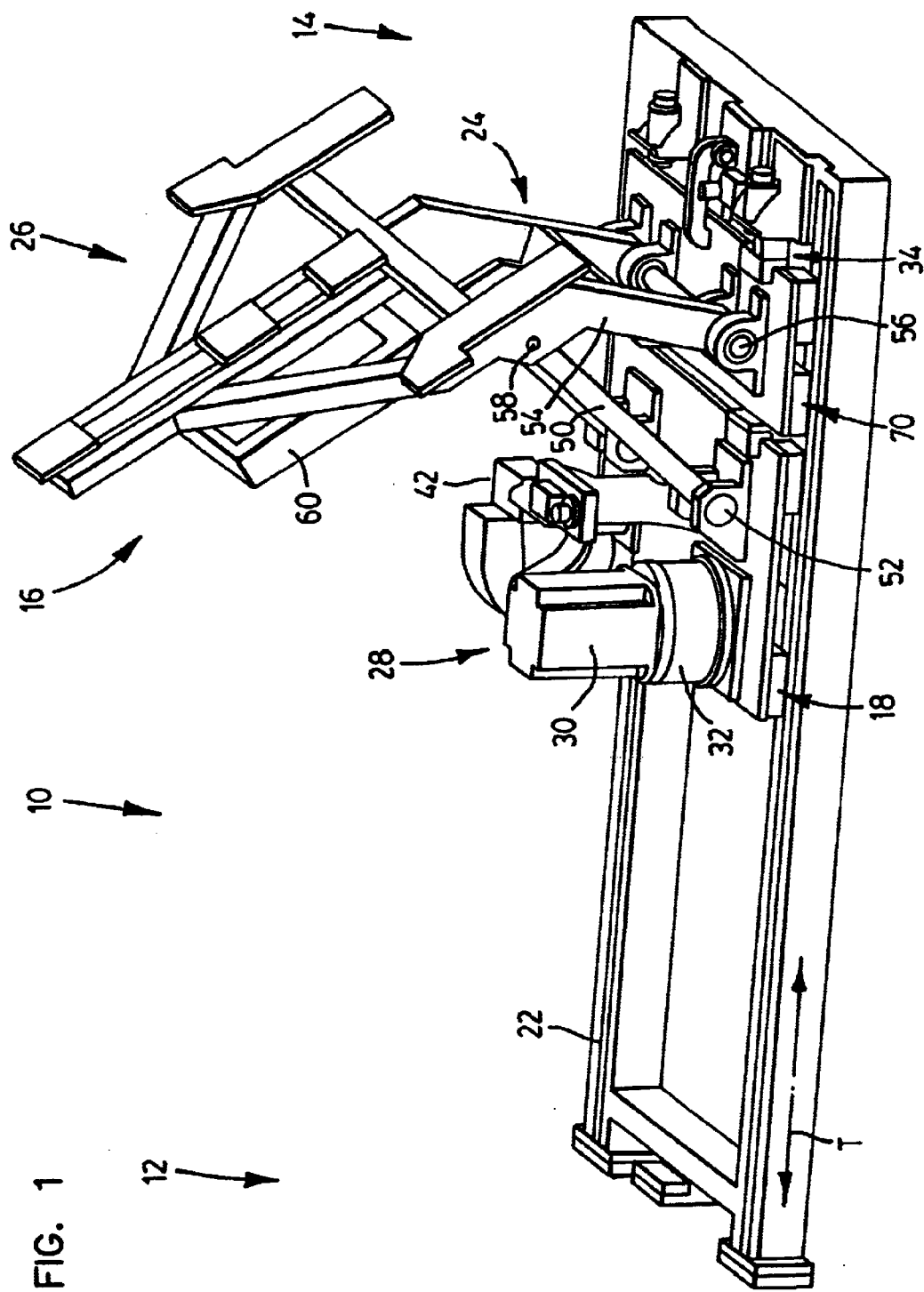
FIG. 1 is a perspective view of a transfer device in one position.

Referring to the figures, there is provided a welding installation 10 comprising a welding station 12 and a loading station 14 and a transfer device 16 to transfer a work piece between them.

The transfer device 16 has an undercarriage with two carriage portions 18 and 20 which are confined to travel along a pair of tracks 22 defining a travel path between the welding station 12 and loading station 14. A first carriage portion 18 and a second carriage portion 20 is joined by a linkage 24 which carries a work piece support 26.

Figure 3:
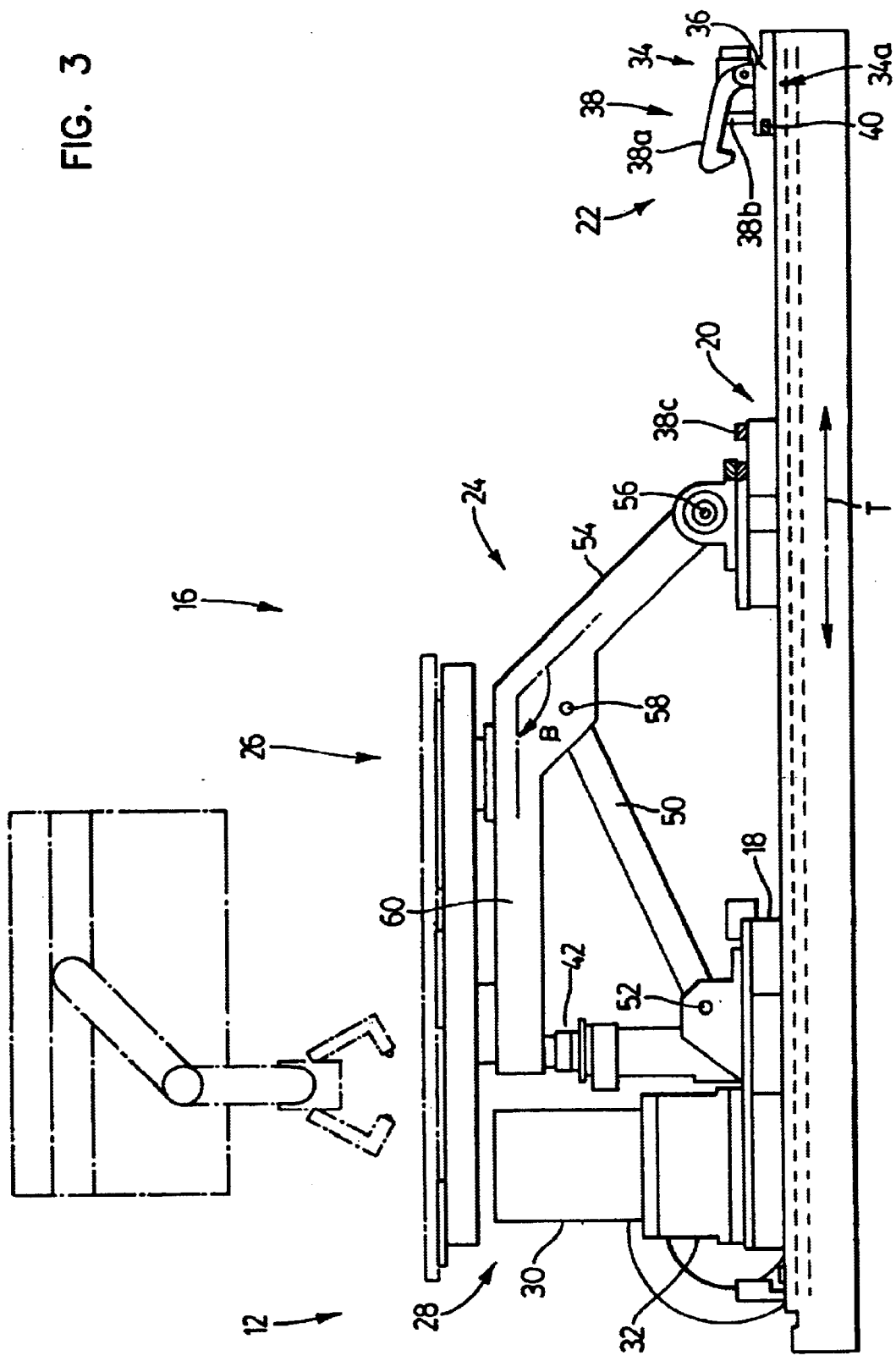
FIG. 3 is a side view of the transfer device of FIG. 1 in another position.

The work piece support 26, is shown in its tilted "loading position" in FIG. 1, and in a generally horizontal "transfer position" in FIG. 3. As will be understood by those of skill in the art, the work piece support can operate in other orientations as well, depending upon factors including, for example, the shape and size of the part components, the manner in which the components are being loaded and the welding procedure.

Figure 2:
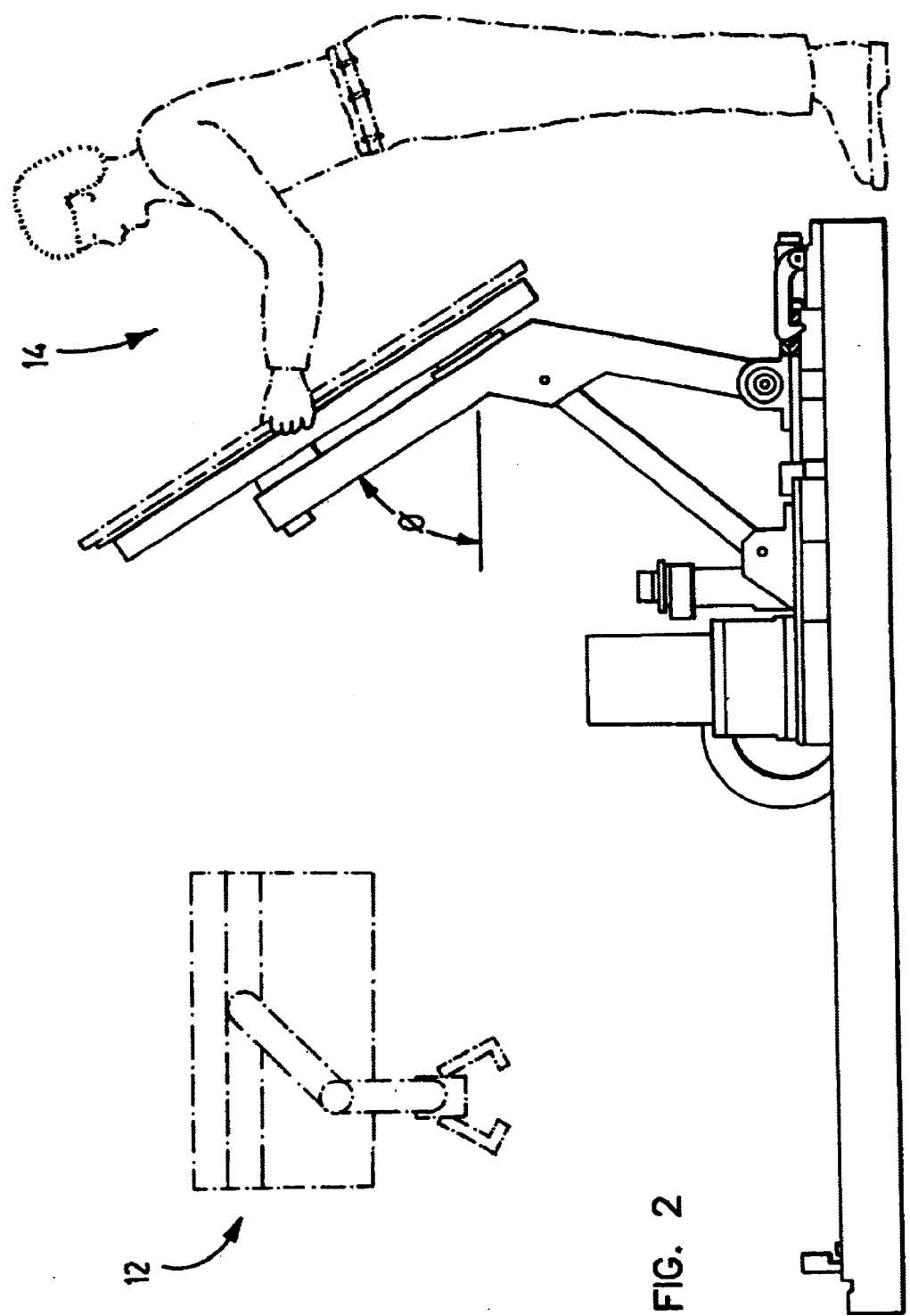
FIG. 2 is a side view of the transfer device of FIG. 1.

The angle of the tilt, shown as 'theta' in FIG. 2, may depend on a number of factors, although an angle of approximately 60 degrees has been found to be advantageous in certain jig loading applications.

A drive unit 28 is positioned on the first carriage portion 18 and includes a servo motor 30 and a transmission drive 32 to displace the carriage portions 18 and 20 along their travel path T. In this case, the transmission is a rack and pinion drive but a number of equivalents are also contemplated as will be understood by those skilled in the art including screw, pneumatic, chain or hydraulic drives and the like.

Referring to FIG. 3, the track is provided with a limit station 34 which engages the second carriage portion 20 as it reaches the loading station. The limit station includes a block 36 which prevents further travel of the carriage portion and a releasable anchor assembly 38 which includes a hook 38a and an actuator 38b. The hook 38a clasps a matching latch 38c on the second carriage portion 20 to restrain it, temporarily, for reasons to be described below. The limit station 34 also includes a limit switch 40 to register the arrival of the second carriage portion 20.

The linkage 24 includes a pair of arms 50 which are pivoted to the first carriage portion 18 at pivots 52 and a pair of arms 54 which are pivoted to the second carriage portion 20 at pivot 56. The arms 50 and 54 are pivoted together at a common pivot 58. The work piece support 26 includes a load bearing member 60 which is fixed, at an angle "beta", to the arms 54. In this case, the pivot 58 is beneath the load bearing member 60. The first carriage portion 18 includes a support extension 42 which supports the load bearing member 60 in its transfer position, as shown in FIG. 3. The support extension also includes a dampening device to absorb the impact loading as the workpiece support reaches its transfer position.

A particular feature of the device 10 is the way in which the drive unit 28 is capable of performing both the "transfer" and the "tilt" functions. It can transfer (or shuttle) the carriage portions between the welding and loading stations in a first phase of motion and then change the orientation of the work piece support (and in this particular case "tilt" the work piece support) between its loading and transfer positions in a second phase of motion. These two functions are linked to the movement of the carriage portions along the travel path. The first phase occurs as both carriages move together, with no relative movement between them, in the same direction along the travel path, while the second phase occurs when one carriage moves relative to the other, along the travel path. Therefore, the second phase can occur when the first carriage portion 18 approaches second carriage portion 20 to raise (or tilt) the work piece support or when first carriage portion 18 departs from second carriage portion 20 to lower the work piece support. These two phases may or may not occur at the same time.

Figure 4:
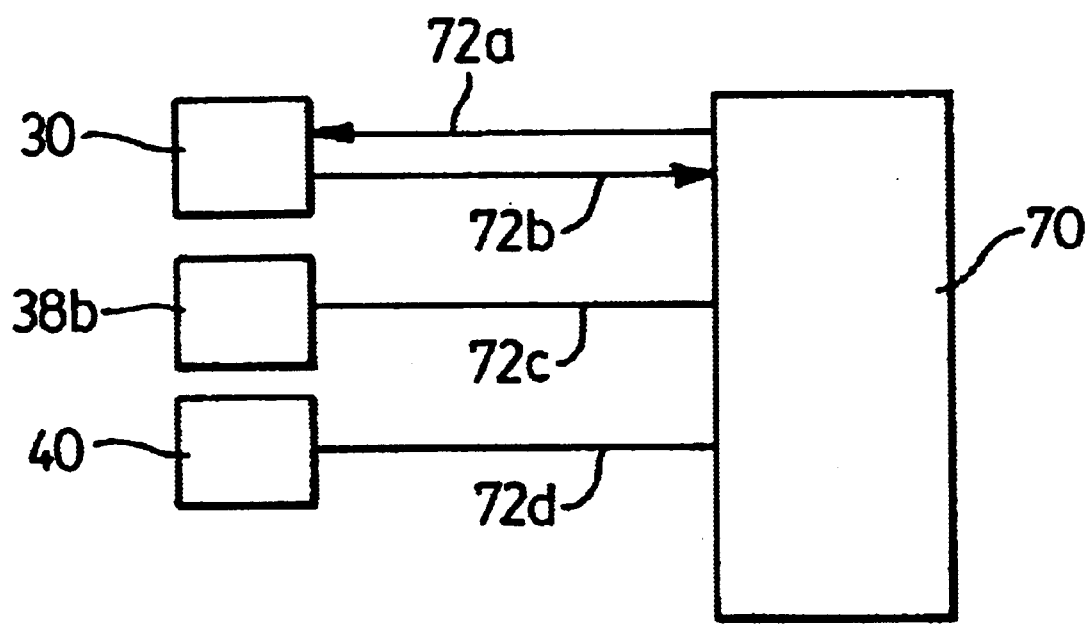
FIG. 4 is a schematic view of one portion of the transfer device of FIG. 1.

Referring to FIG. 4, the transfer device 16 includes a controller 70 to control its various functions. The controller 70 functions with the servo motor 30, the actuator 38b and the limit switch 40 via conductive wireless paths shown at 72a through 72d. It will be understood by those of skill in the art that the device may be provided with additional sensors to synchronize the movements of the device 10 and to coordinate those movements with the others at the welding and loading stations. The device functions in the following manner, based on the work piece support 26 being empty and the transfer device 16 being positioned at the welding station 12. The drive unit 28 is actuated by the controller 70 to move the carriage portions 18, 20 in unison toward the loading station 14 and, consequently, the second carriage portion 20 toward the limit station 34. The second carriage portion 20 abuts the block 36, thereby causing the sensor 34a to signal the controller 70 of the arrival of second carriage portion 20. The controller 70 then triggers the clasp 38a to engage the latch 38c, to restrain the second carriage portion 20 in position.

The drive unit 28 continues to displace the first carriage portion 18 along the travel path, while the second carriage portion 20 is now stationary. This causes the position of the first carriage portion 18 to change relative to the second carriage portion 20, in turn causing the arms 50, 54 to move as the pivot 52 moves toward pivot 56, thereby tilting the work piece support 26 upwardly away from the support extension 42 toward its tilted loading position as shown in FIG. 1. At this point, the drive unit 28 halts for a time period sufficient for the assembly associate to load the work piece support 26, or until the assembly associate signals to the controller that the work piece support 26 has been reloaded and is ready to be transferred back to the welding station 12.

The drive unit then reverses and displaces the first carriage portion 18 away from the second carriage portion 20, in turn causing the arms 50, 54 to move to lower the work piece support until it engages the support extension 42 and the pivots 52 and 56 are at their transfer spacing. The clasp 38a is then released from the latch 38c by the actuator 38b so that the carriage portions 18, 20, once again, travel in unison under the force of the drive unit toward the welding station 12.

Desirably, the drive unit 28 is capable of accelerating and decelerating the carriage portions 18, 20 as they approach the loading and welding stations, as well as other intermediate points therebetween in order to minimize loading on the device.

In the preferred embodiment, the tilting movement of the work piece support 20 between the loading and transfer positions occurs only when the second carriage portion 20 is arrested at the limit station. The drive unit, in this case, is the sole source of power to move the carriage portions together in one phase and to move one of the carriage portions relative to the other, when the latter is arrested, in another phase.

Although the carriage portion is arrested at a limit station in the preferred embodiment, it should be understood that the relative motion of the carriage portions (which is necessary to actuate the pivotal movement of the linkage arms) can be generated by other means. For example, a brake may be used to reduce, or to stop, the speed of the second carriage portion 20 relative to the first carriage portion 18.

The device 10 therefore uses the relative movement between the carriage portions to cause a change in the orientation of the work piece support.

Figure 5A:
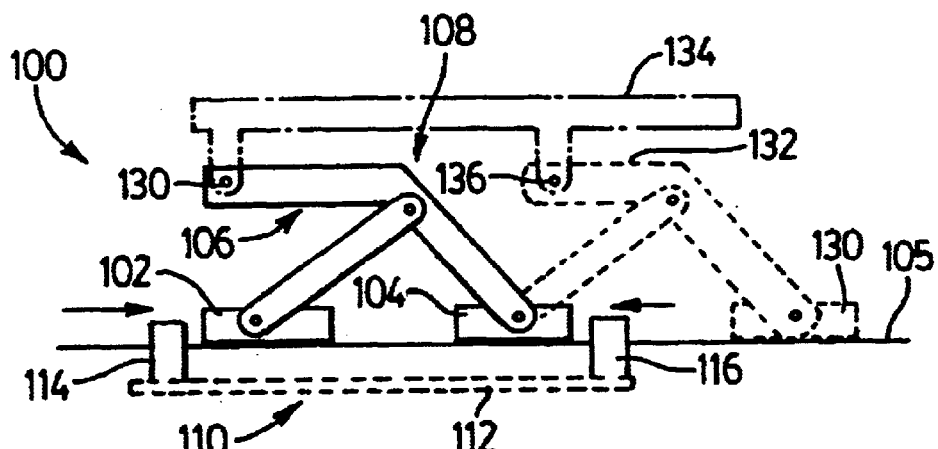
FIGS. 5a, 5b, and 5c are schematic views of other transfer devices.
Figure 5B:
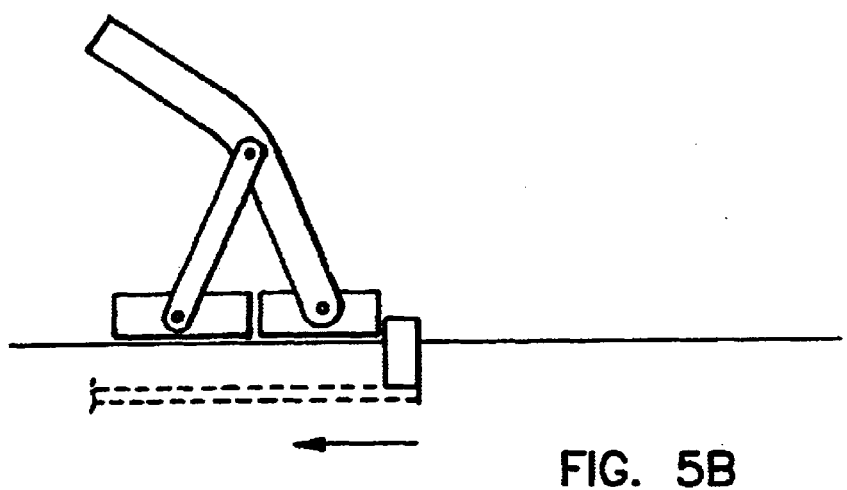
Figure 5C:
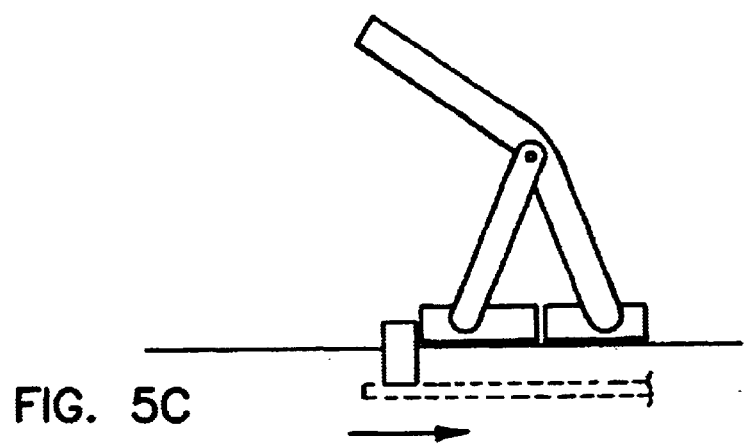

FIGS. 5a, 5b and 5c schematically illustrate several other alternative embodiments. FIG. 5a shows, in solid lines, a transfer device 100 having carriage portions 102, 104 which are movable along a track 105. The carriage portions support a workpiece support 106 by way of a linkage shown at 108. In this case, a drive unit 110 has a chain or equivalent drive member shown in dashed lines at 112. The drive member 112 carries a pair of drive blocks 114, 116 which abut the carriage portions 102, 104. The drive unit 110 reciprocates to the left and then to the right as viewed in FIG. 6a. When travelling to the left, the block 116 abuts the carriage portion 104 and displaces it to the left, as shown by FIG. 5b, in this case with carriage portion 102 stationary. The drive unit then can travel to the right, causing the block 114 to abut the carriage portion 102 and in turn displace it to the right, as shown by FIG. 5b.

FIG. 5a also illustrates, in dashed lines, a third carriage portion 130 and another workpiece support 132. Though not shown in this embodiment, the drive unit 110 or another drive unit equivalent to it (or equivalent to those earlier described, or other drive unit as would be understood by those skilled in the art), may or may not be provided to displace carriage portion 130 relative to carriage portion 104. For example, carriage portion 130 may simply be configured to abut a block at a limit station (not shown) and cause a change in orientation in the workpiece support 132 when the carriage portion 104 is displaced relative to the carriage portion 130.

FIG. 5a illustrates still a further embodiment in chain dotted lines. In this case, the two separate workpiece supports 106 and 132 are replaced by a single workpiece support 134, which is pivoted to the work piece supports 106 and 132 at pivots 136, 138, or by some other linkage as would be understood by those skilled in the art.

It is also contemplated that more than two carriage portions may be employed to cause more than one sequential change in orientation. For example, three carriage portions may be used, wherein the relative movement between the first and second carriage portions causes a first orientation step and the relative movement between the second and third carriage portions causes a second orientation step. Alternatively, the first and second orientation steps may be implemented by linkage between the two carriage portions, along with suitable controls of the positions or displacement of the two carriage portions as described herein and as would be understood by those skilled in the art. For example, the first orientation step might occur in one portion of the relative movement between the carriage portions, while the second orientation step might occur in a second portion of the relative movement.

It is also contemplated that more than two motors may be used in place of the single servo motor and the limit station as illustrated herein. In this case, the two motors may be operated at different speeds and accelerations to achieve the movement of the carriage portions between the welding and loading stations. For example, the two motors could be controlled so that they accelerate and decelerate at different rates so that there is a gradual relative movement between the carriage portions to bring the work piece to its loading position. Thus, while one of the carriage portions in the illustrated embodiment of FIG. 1 is stationary during the transfer of the work piece support to its loading position, there may be instances where it is advantageous to keep both carriage portions moving during this travel.

Figure 6A:
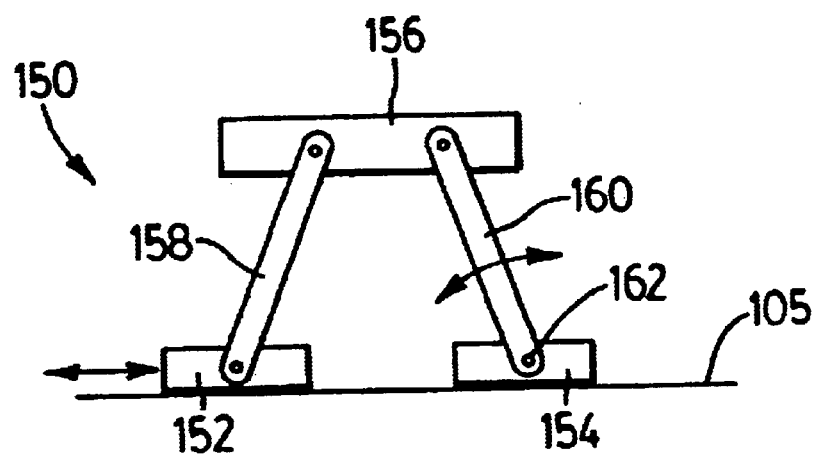
FIGS. 6a, 6b and 6c are schematic views of still another transfer device.
Figure 6B:
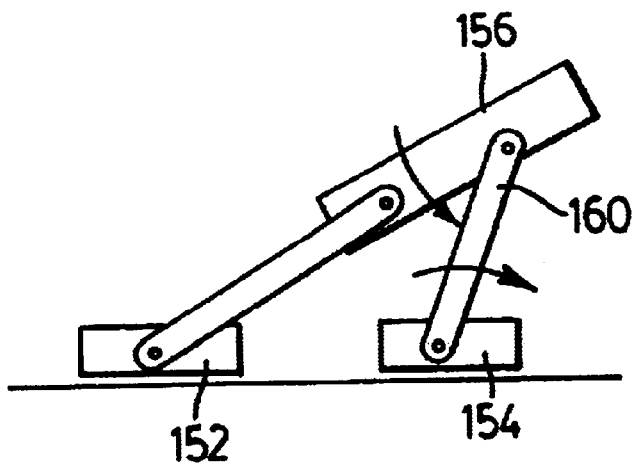
Figure 6C:
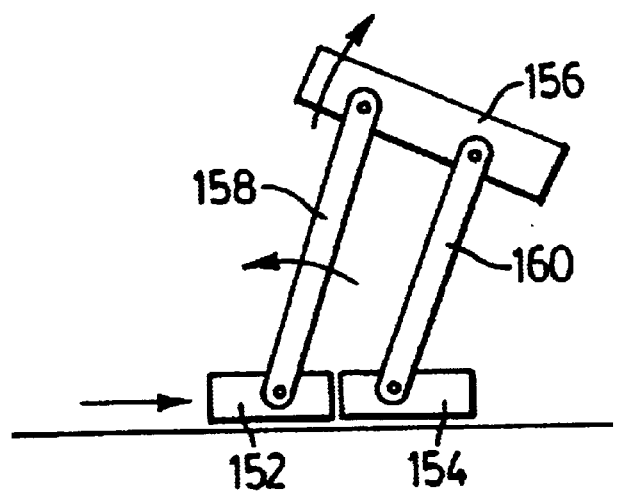

FIGS. 6a through 6c illustrate yet another transfer device 150 having a pair of carriage portions 152 and 154 which support a workpiece support 156 by way of a linkage represented by linkage members 158 and 160. The carriage portion 152 has a drive unit (not shown) to displace the transfer device along the track shown schematically at 156. The carriage portion 154 has a rotational drive unit (not shown), for rotating linkage member 160 about its pivot axis 162. The rotational drive unit may be one of a number of forms, including a servo motor. In FIG. 6b, the linkage member 160 is shown as rotated to the right, while the carriage portion 152, 154 are held stationary, or are travelling at the same speed, thereby with no relative movement between them. Consequently, the workpiece support 156 shifts downwardly in a counterclockwise fashion. In FIG.

6c, the carriage portion 152 is displaced toward carriage portion 154 while the angular position of linkage 160 remains unchanged. Consequently, the linkage member 158 rotates in a counterclockwise fashion and the workpiece support 156 moves in a clockwise fashion to another angular position.

While the travel path of the device 10 is linear, it will be understood that the transfer device may also function where the travel path is curvilinear, and operable in one or more horizontal and inclined planes. In other words, the carriage portions may travel from a welding station at one lower elevation to a loading station at an upper elevation.

While the above embodiment involves a welding installation, the transfer device itself may be used to transfer work pieces between loading stations and other work piece processing stations such as those used in a paint line where, for example, it is important to keep an assembly associate safely away from the processing station.

What is claimed is:

1. A transfer device comprising an undercarriage with two or more carriage portions which are movable along a travel path between a first location and a second location, the carriage portions carrying at least one work piece support, a linkage extending between the carriage portions, where the linkage is operable to change the position of the work piece support when one carriage portion moves relative to another along the travel path, wherein the linkage includes two pairs of arms, each arm being pivotally connected to a corresponding carriage portion.

2. A device as defined in claim 1, further comprising a rotational drive unit for rotating at least one of said pairs of arms.

3. A device as defined in claim 1 wherein said pairs of arms are pivotally connected together at a common pivot location.

4. A device as defined in claim 3 wherein the work piece support is fixedly attached to one of said pair of arms near said common pivot location.

5. A transfer device comprising an undercarriage with two or more carriage portions which are movable along a travel path between a first location and a second location, the carriage portions carrying at least one work piece support, a linkage extending between the carriage portions, where the linkage is operable to change the position of the work piece support when one carriage portion moves relative to another along the travel path, wherein the work piece support is generally horizontal at one of said locations and is inclined at the other of said locations.

6. A transfer device comprising an undercarriage carrying a work piece support between a first location and a second location, the undercarriage including two or more carriage units which are movable along a travel path, the carriage units being operable in a first phase to move along the travel path with substantially no relative movement between the carnage units and a second phase during which one of the carriage units moves relative to another of the carriage units along the travel path, a linkage joining the carriage units, the linkage being operable to change the orientation of the work piece support according to the relative movement between the carriage units in the second phase.

7. A device as defined in claim 6 wherein, during the relative movement, one of said carriage units is stationary.

8. A device as defined in claim 7 wherein the work piece support is movable between a work piece transfer position and a work piece loading position.

9. A device as defined in claims 6 wherein the carriage units are confined to travel along said travel path.

10. A device as defined in claim 9 wherein the travel path is linear.

11. A device as defined in claim 6 further comprising a limit station to limit movement of one of said carriage units along said travel path.

12. A device as defined in claim 6 further comprising a releasable anchor portion for removably anchoring one of said carriage units as the other carriage portion travels along said travel path.

13. A device as defined in claim 6, further comprising one or more track members to engage the one or more carriage units.

14. A device as defined in claim 6 further comprising drive means for moving the carriage units along the travel path.

15. A method of transferring work pieces between a loading and a work piece processing station, comprising:
providing an undercarriage to carry a work piece support between a first location and a second location, the undercarriage having two or more carriage units which are movable along a travel path;
displacing the carriage units between the first and second locations in a first phase with substantially no relative movement between the carriage units and in a second phase during which one of the carriage units moves relative to another of the carriage units along the travel path;
joining the carriage units with a linkage which is operable to change the orientation of the work piece support according to the relative movement between the carriage units in the second phase.

16. A method as defined in claim 15, further comprising the step of providing one or more track members to engage the one or more carriage units.

17. A method as defined in claim 15 wherein, during the relative movement, one of said carriage units is stationary.

18. A method as defined in claim device as defined in claim 16 wherein the work piece support is movable between a work piece transfer position and a work piece loading position.

19. A method as defined in claim 15 wherein the carriage units are confined to travel along said travel path.

20. A method as defined in claim 19 wherein the travel path is linear.

21. A method as defined in claim 15 wherein the linkage includes two pairs of arms, each arm being pivotally connected to a corresponding carriage unit.

22. A method as defined in claim 21, further comprising the step of rotating at least one of said pairs of arms.

23. A method as defined in claim 21 wherein said pairs of arms are pivotally connected together at a common pivot location.

24. A method as defined in claim 22 wherein the work piece support is fixedly attached to one of said pair of arms near said common pivot location.

25. A method as defined in 15 wherein the work piece support is generally horizontal at one of said locations and is inclined at the other of said locations.

26. A method as defined in claim 15 further comprising the step of limiting movement of one of said carriage units along said travel path.

27. A method as defined in claim 15 further comprising providing a releasable anchor portion for removably anchoring one of said carriage units as the other carriage unit travels along said travel path.

28. A method as defined in claim 15 further comprising drive means for moving the carriage units along the travel path.

29. A method of transferring work pieces between a loading station and a work piece processing station, comprising:
   a. a step for providing a work piece support;
   b. a step for supporting the work piece support on a carriage to carry the work piece support between a first location and a second location;
   c. a step for equipping the carriage with two or more carriage units which are movable along a travel path;
   d. step for displacing the carnage units between the first and second locations in a first phase with substantially no relative movement between the carriage units and in a second phase during which one of the carriage units moves relative to another of the carriage units along the travel path; and
   e. a step for providing a linkage between the work piece support and the carriage portions which is operable to change the orientation of the work piece support according to the relative movement between the carriage units in the second phase.

30. A method as defined in claim 29, further comprising a step for providing one or more track members to engage the one or more carriage units.

31. A method as defined in claim 29 wherein, during the relative movement, one of said carriage units is stationary.

32. A method as defined in claim device as defined in claim 29 wherein the work piece support is movable between a work piece transfer position and a work piece loading position.

33. A method as defined in claim 29 the carriage units are confined to travel along said travel path.

34. A method as defined in claim 29 wherein the travel path is linear.

35. A method as defined in claim 29 wherein the linkage includes two pairs of arms, each arm being pivotally connected to a corresponding carriage unit.

36. A method as defined in claim 35, further comprising a step for rotating at least one of said pairs of arms.

37. A method as defined in claim 35 wherein said pairs of arms are pivotally connected together at a common pivot location.

38. A method as defined in claim 37 wherein the work piece support is fixedly attached to one of said pair of arms near said common pivot location.

39. A method as defined in 29 wherein the work piece support is generally horizontal at one of said locations and is inclined at the other of said locations.

40. A method as defined in claim 29 further comprising the step of limiting movement of one of said carriage units along said travel path.

41. A method as defined in claim 29 comprising providing a releasable anchor portion for removably anchoring one of said carriage units as the other carriage unit travels along said travel path.

42. A method as defined in claim 29 further comprising drive means for moving the carriage units along the travel path.

43. A welding installation comprising a welding station, a loading station and a transfer device for transferring a work piece between the stations, the transfer device having a work piece support and an undercarriage with two or more carriage portions, the carriage portions being movable by a drive unit along a travel path between the loading station and the welding station, the carriage portions being interconnected by a linkage which is operable to change the orientation of the work piece support together with a corresponding change in the position of one carriage portion relative to the other along the travel path.

44. An installation as defined in claim 43, further comprising one or more track members to engage the two or more carriage portions.

45. An installation as defined in claim 43 wherein, the change in the position of one carriage portion relative to the other occurs when one of said carriage portions is stationary.

46. An installation as defined in claim 44 wherein the work piece support is movable between a work piece transfer position and a work piece loading position.

47. An installation as defined in claim 43 wherein the carriage portions are confined to travel along said travel path.

48. An installation as defined in claim 47 wherein the travel path is linear.

49. An installation as defined in claim 43 wherein the linkage includes two pairs of arms, each arm being pivotally connected to a corresponding carnage portion.

50. An installation as defined in claim 49, further comprising a rotational drive unit for rotating at least one of said pairs of arms.

51. An installation as defined in claim 49 wherein said pairs of arms are pivotally connected together at a common pivot location.

52. An installation as defined in claim 51 wherein the work piece support is fixedly attached to one of said pair of arms near said common pivot location.

53. An installation as defined in claim 51 wherein the work piece support is generally horizontal at one of said locations and is inclined at the other of said locations.

54. An installation as defined in claim 51 further comprising a limit station to limit movement of one of said carriage portions along said travel path.

55. An installation as defined in claim 51 further comprising a releasable anchor unit for removably anchoring one of said carriage portions as the other carriage potion travels along said travel path.

56. An installation as defined in claim 43 further comprising drive means for moving the carriage portions along the travel path.

57. A transfer device for transferring a work piece between a loading station and a welding station, comprising:
   a. undercarriage means having at least two carriage means, the carriage means movable independently of one another along a travel path between the loading station and the welding station;
   b. work piece support means supported by the undercarriage means;
   c. drive means to transfer at least one of said carriage means between the loading and welding stations; and
   d. linkage means joining each of the carriage means for orienting the work piece support means between a transfer portion and a loading position;
      wherein the linkage means is actuated in response to one carriage means moving relative to the other carnage means along the travel path.

58. A device as defined in claim 57, further comprising one or more track means to engage the carriage means.

59. A device as defined in claim 57 wherein, the movement of one carriage means relative to the other carriage means occurs when one of said carriage means is stationary.

60. A device as defined in claim 59 wherein the work piece support means is movable between a work piece transfer position and a work piece loading position.

61. A device as defined in claim 57 wherein the carriage means are confined to travel along said travel path.

62. A device as defined in claim 57 wherein the travel path is linear.

63. A device as defined in claim 57 wherein the linkage means includes two pairs of arms, each arm being pivotally connected to a corresponding carriage means.

64. A device as defined in claim 63, further comprising a rotational drive means for rotating at least one of said pairs of arms.

65. A device as defined in claim 64 said pairs of arms are pivotally connected together at a common pivot location.

66. A device as defined in claim 57 wherein the work piece support means is fixedly attached to one of said pair of arms near said common pivot location.

67. A device as defined in claim 57 wherein the work piece support is generally horizontal at one of said locations and is inclined at the other of said locations.

68. A device as defined in claim 57 further comprising a limit means to limit movement of one of said carriage means along said travel path.

69. A device as defined in claim 57 further comprising releasable anchor means for removably anchoring one of said carriage means as the other of said carriage means travels along said travel path.

70. A device as defined in claim 57 further comprising drive means for moving the carnage means along the travel path.

71. A transfer device comprising an undercarriage carrying a work piece support between a first location and a second location along a travel path, the undercarriage including two or more carriage units which are movable along the travel path, the carnage units being operable in a first phase to move along the travel path with substantially no relative movement between the carriage units and a second phase during which one of the carriage units moves relative to another of the carriage units along the travel path, a linkage joining the carriage units, the linkage being operable to change the orientation of the work piece support according to the relative movement between the carriage units in the second phase.

72. A device as defined in claim 71, further comprising one or more track members to engage the one or more carriage units.

73. A device as defined in claim 71 wherein, during the second phase, one of said carnage units is stationary.

74. A welding installation comprising a welding station, a loading station and a transfer device for transferring a work piece between the stations, the transfer device having a work piece support and an undercarriage with two or more carriage portions, the carriage portions being movable by a drive unit along a travel path between the loading station and the welding station, the carriage portions being interconnected by a linkage which is operable to change the orientation of the work piece support together with a corresponding change in the position of one carriage portion relative to the other along the travel path.

* * * * *

UNITED STATES PATENT AND TRADEMARK OFFICE
CERTIFICATE OF CORRECTION

PATENT NO. : 6,634,484 B2 Page 1 of 1
DATED : October 21, 2003
INVENTOR(S) : Gattrell et al.

It is certified that error appears in the above-identified patent and that said Letters Patent is hereby corrected as shown below:

Column 1,
Line 41, after "functions" delete "can".

Column 7,
Line 55, delete "carnage" and insert -- carriage --, therefor.
Line 66, delete "claims" and insert -- claim --, therefor.

Column 9,
Line 11, delete "carnage" and insert -- carriage --, therefor.
Line 31, after "claim 29" insert -- wherein --.
Line 52, after "claim 29" insert -- further --.

Column 10,
Line 18, delete "carnage" and insert -- carriage --, therefor.
Line 37, delete "potion" and insert -- portion --, therefor.
Line 57, delete "carnage" and insert -- carriage --, therefor.

Column 11,
Line 9, after "claim 64" insert -- wherein --.
Line 25, delete "carnage" and insert -- carriage --, therefor.

Column 12,
Lines 2 and 16, delete "carnage" and insert -- carriage --, therefor.

Signed and Sealed this

Fifteenth Day of June, 2004

JON W. DUDAS
*Acting Director of the United States Patent and Trademark Office*